(12) United States Patent
Hwang

(10) Patent No.: US 10,746,432 B2
(45) Date of Patent: Aug. 18, 2020

(54) AIR CONDITIONER HAVING VARIABLE AIR VOLUME CONTROL DEVICE

(71) Applicant: Yong Hee Hwang, Gyeonggi-do (KR)

(72) Inventor: Yong Hee Hwang, Gyeonggi-do (KR)

( * ) Notice: Subject to any disclaimer, the term of this patent is extended or adjusted under 35 U.S.C. 154(b) by 0 days.

(21) Appl. No.: 15/274,803

(22) Filed: Sep. 23, 2016

(65) Prior Publication Data

US 2017/0051943 A1 Feb. 23, 2017

Related U.S. Application Data

(63) Continuation of application No. PCT/KR2016/000694, filed on Jan. 22, 2016.

(30) Foreign Application Priority Data

Jan. 23, 2015 (KR) .......................... 10-2015-0011041

(51) Int. Cl.
*F24F 13/10* (2006.01)
*F24F 11/30* (2018.01)
(Continued)

(52) U.S. Cl.
CPC ................ *F24F 13/10* (2013.01); *F24F 1/00* (2013.01); *F24F 1/005* (2019.02); *F24F 1/0007* (2013.01); *F24F 1/0014* (2013.01); *F24F 3/1603* (2013.01); *F24F 11/30* (2018.01); *F24F 11/62* (2018.01); *F24F 11/77* (2018.01); *F24F 13/14* (2013.01); *F24F 11/65* (2018.01)

(58) Field of Classification Search
CPC .. F24F 2001/004; F24F 11/022; F24F 11/025; F24F 11/04; F24F 13/10; F24F 13/16; F24F 1/0018; F24F 1/005; F24F 1/0007; F24F 1/0014; F24F 11/62; F24F 2013/1433; F24F 13/28; F24F 13/1413
USPC .......................................................... 62/186
See application file for complete search history.

(56) References Cited

U.S. PATENT DOCUMENTS 5,461,875 A * 10/1995 Lee .......................... F24F 11/00
454/236
5,775,415 A * 7/1998 Yoshimi ............. B60H 1/00821
165/202
(Continued)

FOREIGN PATENT DOCUMENTS

CN 1699838 A 11/2005
CN 1712826 A 12/2005
(Continued)

OTHER PUBLICATIONS

Electrical Wiring Diagrams for Air Conditioning Systems, 2014.*
(Continued)

*Primary Examiner* — Nelson J Nieves
(74) *Attorney, Agent, or Firm* — Fenwick & West LLP

(57) ABSTRACT

Provided is an air conditioner including a variable air volume control device. The air conditioner includes: an indoor unit main body including a main outlet through which air is discharged; a blower placed in the indoor unit main body and blowing air toward the main outlet; and a controller adjusting a second discharge rate of air in an air cleaning mode independently of a first discharge rate of air in a heating or cooling mode, wherein the second discharge rate of air is varied within a range different from a range in which the first discharge rate of air is varied.

2 Claims, 13 Drawing Sheets

(51) Int. Cl.
*F24F 11/62* (2018.01)
*F24F 11/77* (2018.01)
*F24F 13/14* (2006.01)
*F24F 11/65* (2018.01)
*F24F 3/16* (2006.01)
*F24F 1/0014* (2019.01)
*F24F 1/0007* (2019.01)
*F24F 1/005* (2019.01)
*F24F 1/00* (2019.01)

(56) References Cited

U.S. PATENT DOCUMENTS

| | | | | |
|---|---|---|---|---|
| 5,904,048 | A * | 5/1999 | Lee | F24F 1/0011 454/236 |
| 6,282,910 | B1 * | 9/2001 | Helt | F24F 11/0079 62/229 |
| 2004/0144249 | A1 * | 7/2004 | Kang | F24F 3/1603 95/1 |
| 2005/0051321 | A1 * | 3/2005 | Lee | F24F 1/0007 165/234 |
| 2005/0081556 | A1 * | 4/2005 | Kim | F24F 3/16 62/411 |
| 2005/0115258 | A1 * | 6/2005 | Violand | F24F 1/027 62/186 |
| 2005/0257560 | A1 * | 11/2005 | Lee | F24F 1/0007 62/419 |
| 2005/0284114 | A1 | 12/2005 | Kim et al. | |
| 2005/0284158 | A1 * | 12/2005 | Lee | F24F 11/001 62/126 |
| 2006/0086138 | A1 * | 4/2006 | Park | F24F 1/0007 62/428 |
| 2007/0111655 | A1 * | 5/2007 | Song | F24F 11/0017 454/292 |
| 2007/0234689 | A1 * | 10/2007 | Dietz | F24F 3/1603 55/418 |
| 2008/0074824 | A1 * | 3/2008 | Furuhashi | A61L 9/22 361/231 |
| 2008/0220713 | A1 * | 9/2008 | Kim | F24F 1/0007 454/339 |
| 2009/0100850 | A1 * | 4/2009 | Yasukawa | A61L 9/22 62/259.1 |
| 2009/0199583 | A1 | 8/2009 | Jeon et al. | |
| 2009/0282853 | A1 * | 11/2009 | Lee | B01D 46/0023 62/317 |
| 2010/0178863 | A1 * | 7/2010 | Coward | F24F 11/047 454/333 |
| 2010/0294134 | A1 * | 11/2010 | Yokomizo | B01D 46/0065 96/405 |
| 2011/0059686 | A1 | 3/2011 | Hwang et al. | |
| 2012/0171949 | A1 | 7/2012 | Baik | |
| 2012/0216985 | A1 * | 8/2012 | Tai | F24H 9/0057 165/59 |
| 2012/0270494 | A1 * | 10/2012 | McCarty | F24F 1/0007 454/241 |
| 2012/0301363 | A1 * | 11/2012 | Kim | B01D 53/8678 422/122 |
| 2013/0056174 | A1 * | 3/2013 | Ryu | F24F 1/0007 165/54 |
| 2013/0086935 | A1 * | 4/2013 | Huang | F24F 1/0011 62/408 |
| 2014/0099875 | A1 * | 4/2014 | Kim | F24F 13/10 454/322 |
| 2014/0102664 | A1 * | 4/2014 | Kim | F24F 11/0086 165/11.1 |
| 2014/0367069 | A1 * | 12/2014 | Yamaguchi | F24F 1/0007 165/56 |
| 2015/0075373 | A1 * | 3/2015 | Miller | F24F 3/1603 95/15 |
| 2015/0276249 | A1 * | 10/2015 | Rasmussen | F24F 11/0001 454/251 |

FOREIGN PATENT DOCUMENTS

| | | |
|---|---|---|
| CN | 1766432 A | 5/2006 |
| CN | 1967078 A | 5/2007 |
| CN | 101227933 A | 7/2008 |
| CN | 100520801 C | 7/2009 |
| CN | 102012074 A | 4/2011 |
| EP | 1367336 A1 | 12/2003 |
| EP | 1788318 B1 | 7/2006 |
| EP | 2602563 A1 | 6/2013 |
| JP | 05-118630 A | 5/1993 |
| JP | H09112951 A | 5/1997 |
| JP | H09243150 A | 9/1997 |
| JP | 2679521 B2 | 11/1997 |
| JP | 2008-196778 A | 8/2008 |
| JP | 2014-066449 A | 4/2014 |
| KR | 10-2005-0122524 A | 12/2005 |
| KR | 10-2007-0049432 A | 5/2007 |
| KR | 10-2007-0052447 A | 5/2007 |
| TW | 201418637 A | 5/2014 |
| WO | WO 2007-049849 A2 | 5/2007 |

OTHER PUBLICATIONS

Volume Control Dampers, 2013.*
Extended European Search Report, European Application No. 16740431.8, dated Jan. 29, 2019, 8 pages.
European Patent Office, Examination Report, European Application No. 16740431.8, dated Nov. 25, 2019, 5 pages.
Indian Patent Office, Office Action, Indian Application No. 201737029077, dated Jan. 13, 2020, 7 pages.
Russian Patent Office, Office Action, Russian Application No. 2017129724, dated Jul. 17, 2019, 5 pages.

* cited by examiner

AIR CONDITIONER HAVING VARIABLE AIR VOLUME CONTROL DEVICE

RELATED APPLICATIONS

This Application is a continuation application of PCT Application No. PCT/KR2016/000694, filed Jan. 22, 2016, which claims priority to Korean Patent Application No. 10-2015-0011041 filed on Jan. 23, 2015 and entitled AIR CONDITIONER HAVING VARIABLE AIR VOLUME CONTROL DEVICE, the disclosure of which are incorporated herein in its entirety by reference.

BACKGROUND OF THE INVENTION

1. Field of the Invention

The present invention relates to an air conditioner, and more particularly, to an air conditioner including a variable air volume control device capable of varying the discharge rate of air independently in an air cleaning mode and a heating/cooling mode.

2. Description of the Related Art

Air conditioners are used to cool or heat indoor air. There are various types of air conditioners having various shapes, such as wall-mount-type air conditioners, stand-type air conditioners, large air conditioners, and small air conditioners.

If an air conditioner is operated in a cooling mode, a gas-phase refrigerant compressed by a compressor is condensed by a condenser through heat exchange with outdoor air, and then the condensed refrigerant is supplied to an evaporator through an expansion valve. At the evaporator, the refrigerant evaporates while exchanging heat with indoor air, and thus an indoor area is cooled. If the air conditioner is operated in a heating mode, the above-mentioned cycle is performed in the reverse order, and thus the indoor area is heated.

As described above, since air conditioners are used for cooling cycles or heat pump cycles, air conditioners generally include: an outdoor unit including a compressor and a condenser so as to compress and condense a refrigerant; and an indoor unit including an evaporator so as to cool an indoor area by evaporating the refrigerant. However, some air conditioners include indoor and outdoor units combined as one unit.

In addition, a large number of recent air conditioners include indoor units equipped with air cleaners so as to remove contaminants from air in addition to heating/cooling air in a heating/cooling mode.

Such air conditioners capable of removing contaminants such as dust from indoor air may be operated in seasons such as winter in which cooling is not necessary, so as to provide a pleasant indoor environment.

FIG. 1 is a perspective view illustrating an air conditioner of the related art including an air cleaner 10.

Referring to FIG. 1, in the air conditioner of the related art, an inlet 2 is formed in a lower region of a front panel 1 so as to introduce indoor air into the air conditioner, and an outlet 3 is formed in an upper region of the air conditioner so as to discharge the air to an indoor area after a heat-exchange or purification process.

An inlet grill 4 and an outlet grill 5 are respectively arranged on the inlet 2 and the outlet 3 in a front-to-rear, horizontal, or vertical direction so as to protect the inside of the air conditioner while allowing air to flow therethrough.

In addition, the air cleaner 10 is arranged in a center region of the front panel 1 to purify indoor air.

Unlike the air conditioner illustrated in FIG. 1, air cleaners 10 of some air conditioners are not exposed to the outside. In any types of air conditioners of the related art, however, the flow rate of indoor air through an outlet (3, refer to FIG. 1) in an air cleaning mode is dependent on the flow rate of indoor air in a heating or cooling mode. That is, it is impossible to independently vary the discharge rate of indoor air in air cleaning mode. Therefore, technology for removing this problem is required.

SUMMARY OF THE INVENTION

Technical Problem

The object of the present invention is to provide an air conditioner including a variable air volume control device capable of varying the discharge rate of air independently in an air cleaning mode and a heating/cooling mode.

Technical Solution

To solve the above-mentioned technical problem, the present invention provides an air conditioner including: an indoor unit main body including a main outlet through which air is discharged; a blower placed in the indoor unit main body and blowing air toward the main outlet; and a controller adjusting a second discharge rate of air in an air cleaning mode independently of a first discharge rate of air in a heating or cooling mode, wherein the second discharge rate of air is varied within a range different from a range in which the first discharge rate of air is varied.

Advantageous Effects Of The Invention

According to the present invention, the discharge rate of air in an air cleaning mode may be varied independently of the discharge rate of air in a heating/cooling mode. That is, the discharge rate of air in the air cleaning mode may be varied according to a user's instruction independently of the discharge rate of air in the heating/cooling mode.

According to the present invention, if it is necessary to keep an indoor area silent in an air cleaning mode, a variable air volume control device may be operated to decrease the discharge rate of air and thus to reduce noise. Conversely, if it is necessary to rapidly clean indoor air, the variable air volume control device may be operated to increase the discharge rate of air to an original value.

According to the present invention, particularly, since the discharge rate of air is independently varied without a significant structural change from an air conditioner structure of the related art, the air conditioner of the present invention may be very conveniently used and losses that may be caused by the purchase of an additional air cleaner may be prevented.

DETAILED DESCRIPTION OF THE PREFERRED EMBODIMENTS

Figure 1:
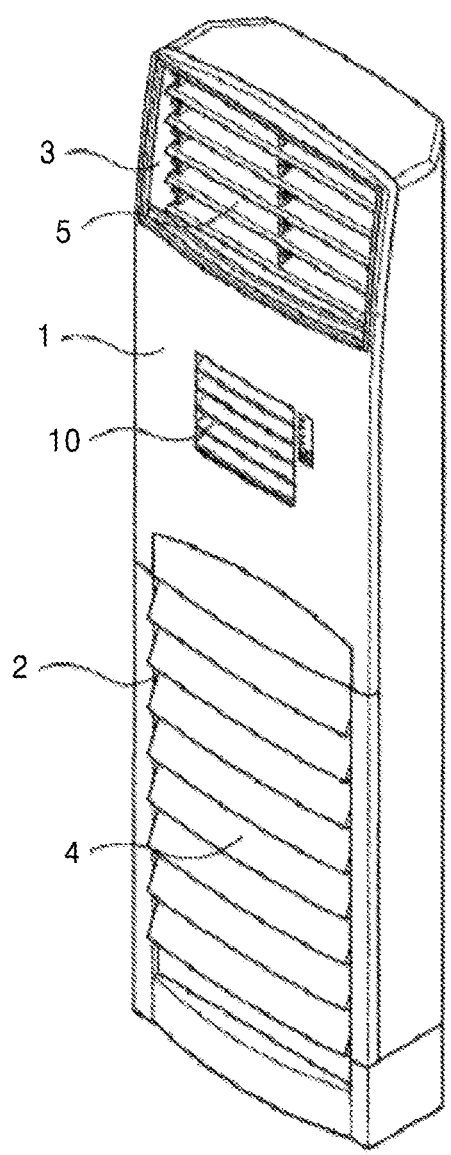
FIG. 1 is a perspective view illustrating an air conditioner of the related art including an air cleaner.

Advantages and features of the present invention, and implementation methods thereof will be clarified through the following descriptions given with reference to the accompanying drawings.

However, the present invention is not limited to the embodiments set forth herein but may be embodied in different forms.

Rather, these embodiments are provided so that the present invention will be thorough and complete, and will fully convey the scope of the present invention to those skilled in the art. Therefore, the scope of the present invention should be defined by the claims.

Accordingly, in some embodiments, well-known device structures, well-known processes, and well-known techniques will not be described in detail to avoid ambiguous interpretation of the present invention.

Throughout the present disclosure, like reference numerals denote like elements. In the following description, technical terms are used only for explaining exemplary embodiments, and not for purposes of limitation.

The terms of a singular form may include plural forms unless specifically mentioned. In addition, the term "comprises (or includes)" specifies the presence of stated elements or operations (action), but does not preclude the presence or addition of one or more other elements or operations (actions).

Unless otherwise defined, all terms (including technical and scientific terms) used herein have the same meaning as commonly understood by those of ordinary skill in the art to which this invention belongs.

It will be further understood that terms, such as those defined in commonly used dictionaries, will not be interpreted in an idealized or overly formal sense unless so defined herein.

Hereinafter, preferred embodiments of the present invention will be described with reference to the accompanying drawings.

Figure 2:
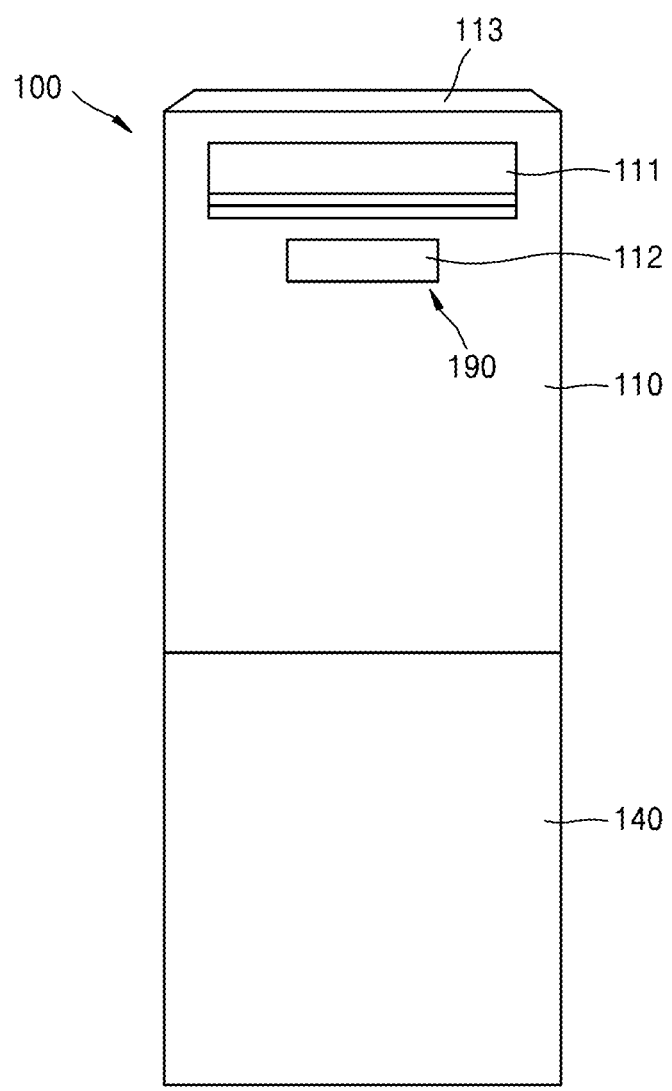
FIG. 2 is a schematic front perspective view illustrating an air conditioner according to a first embodiment of the present invention.
Figure 3:
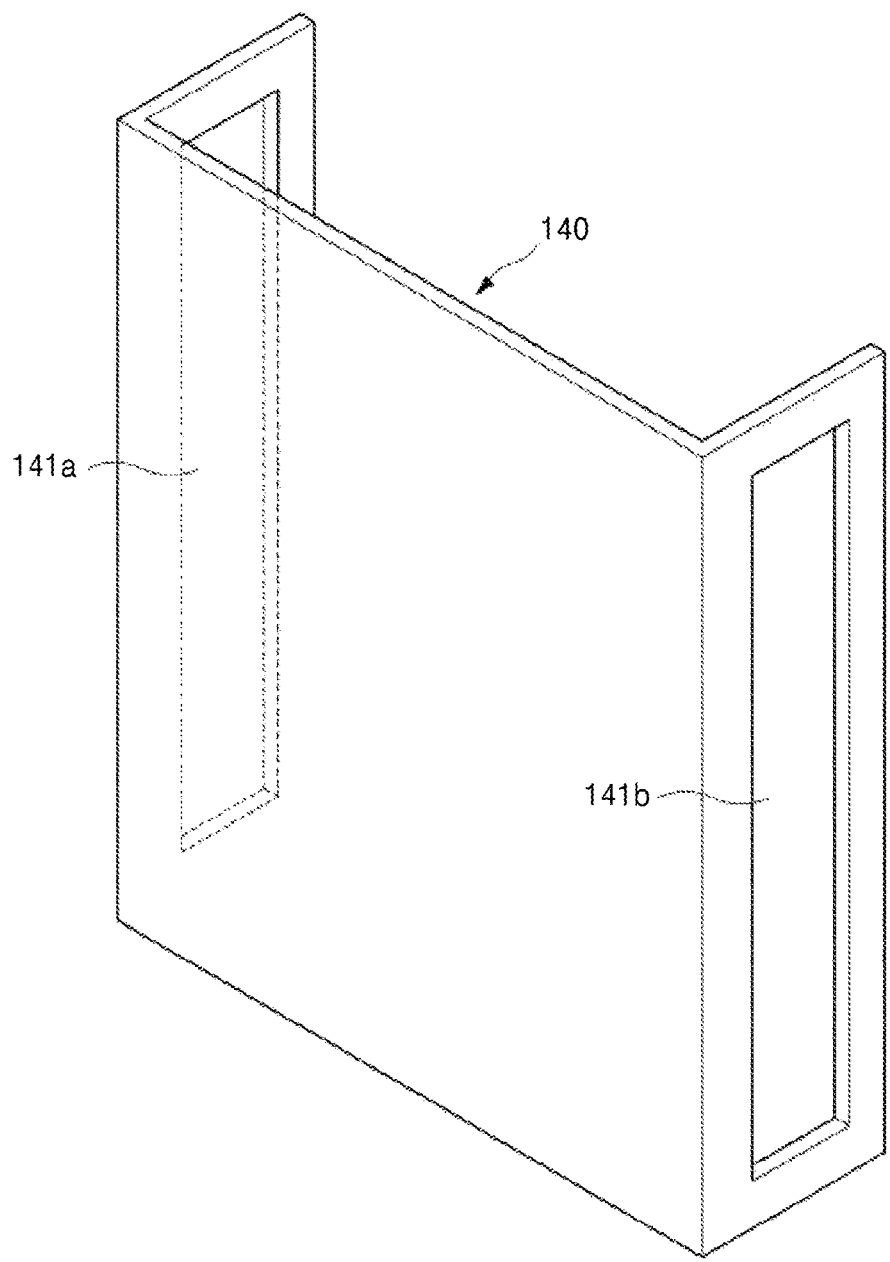
FIG. 3 is a perspective view illustrating a front inlet panel.
Figure 4:
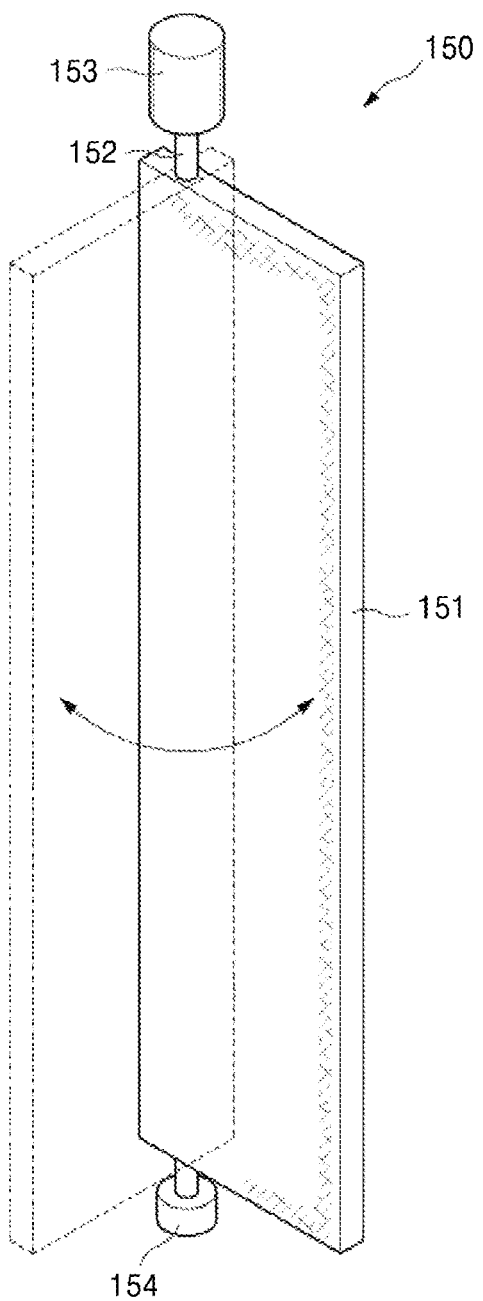
FIG. 4 is a perspective view illustrating a blade unit.
Figure 5:
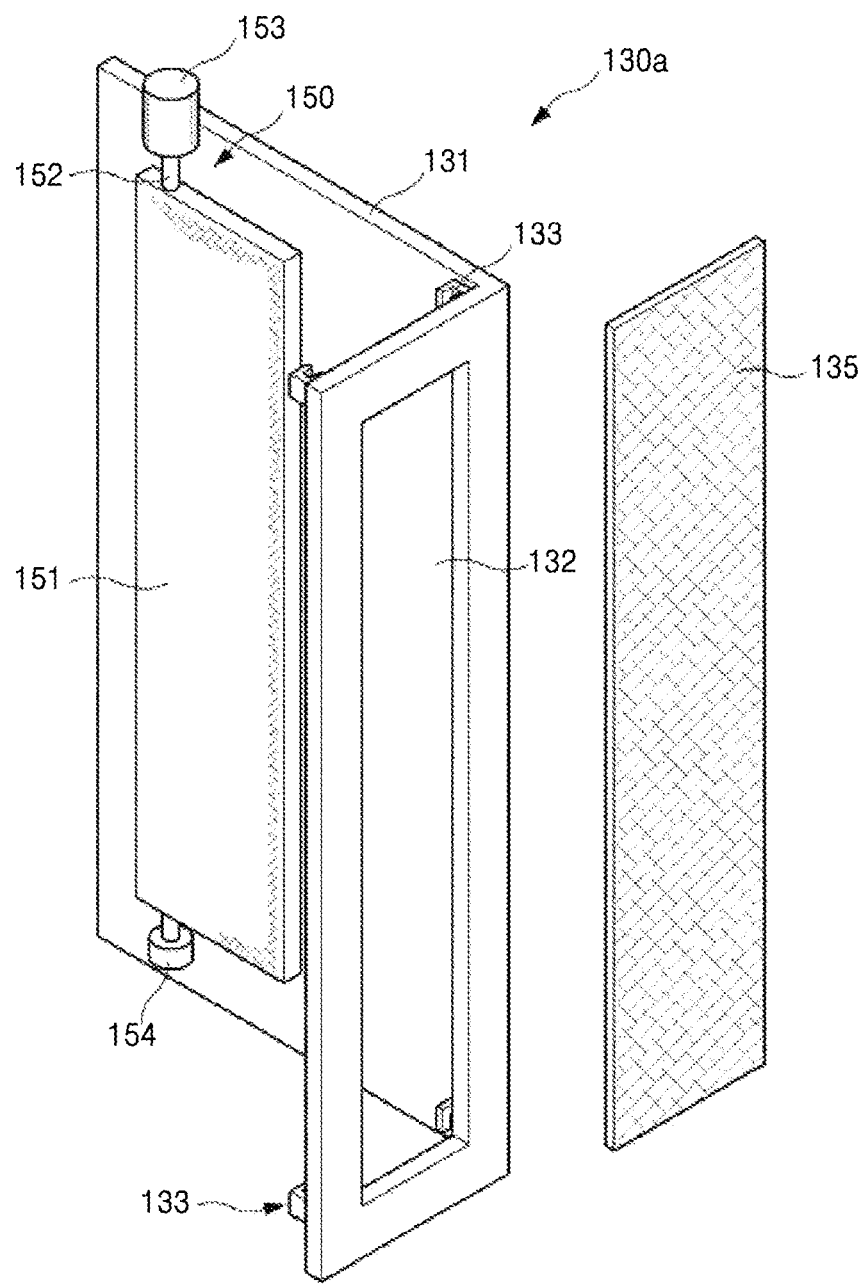
FIGS. 5 and 6 are views illustrating an operation of a left variable air volume control device.
Figure 6:
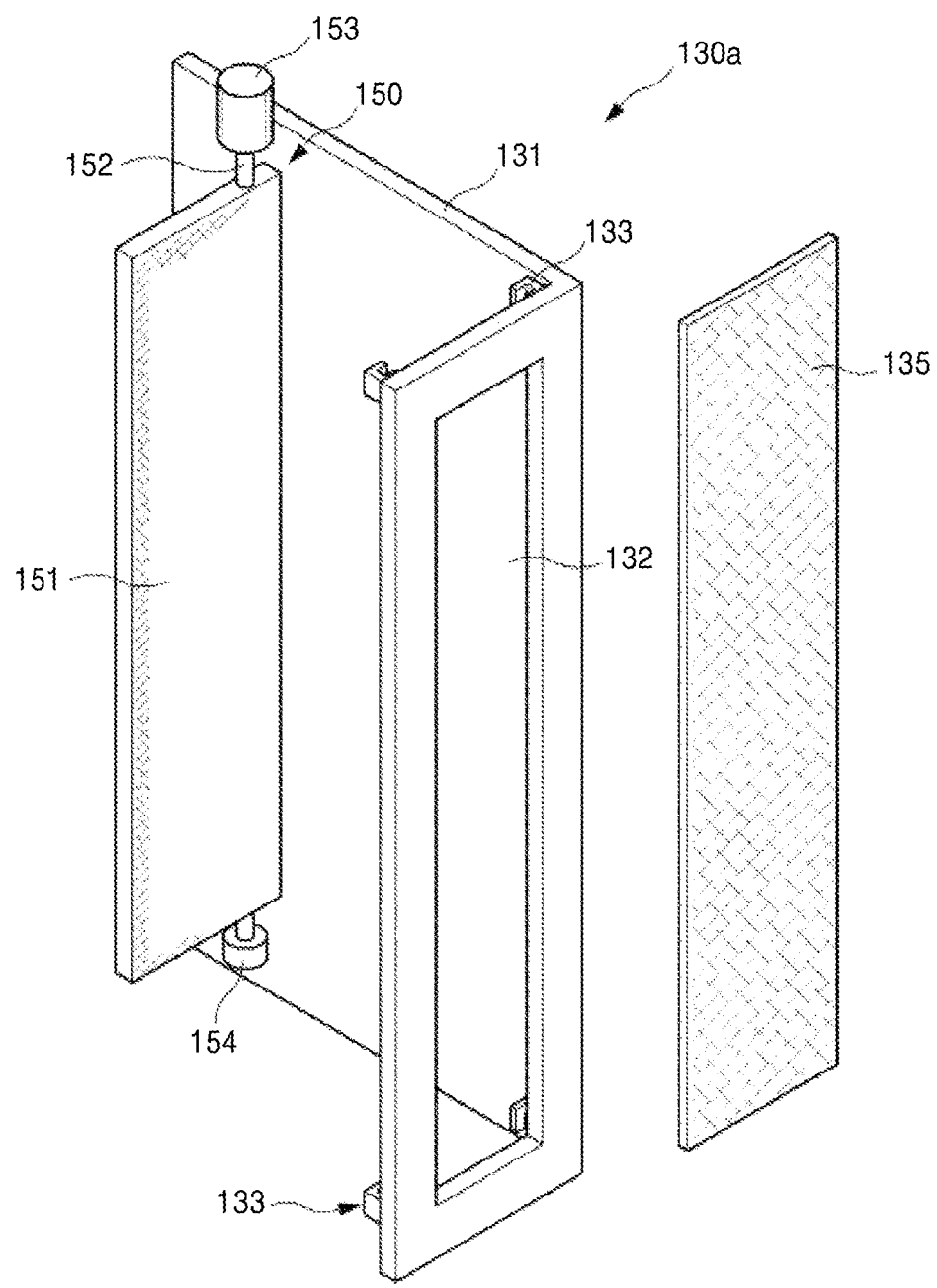
Figure 7:
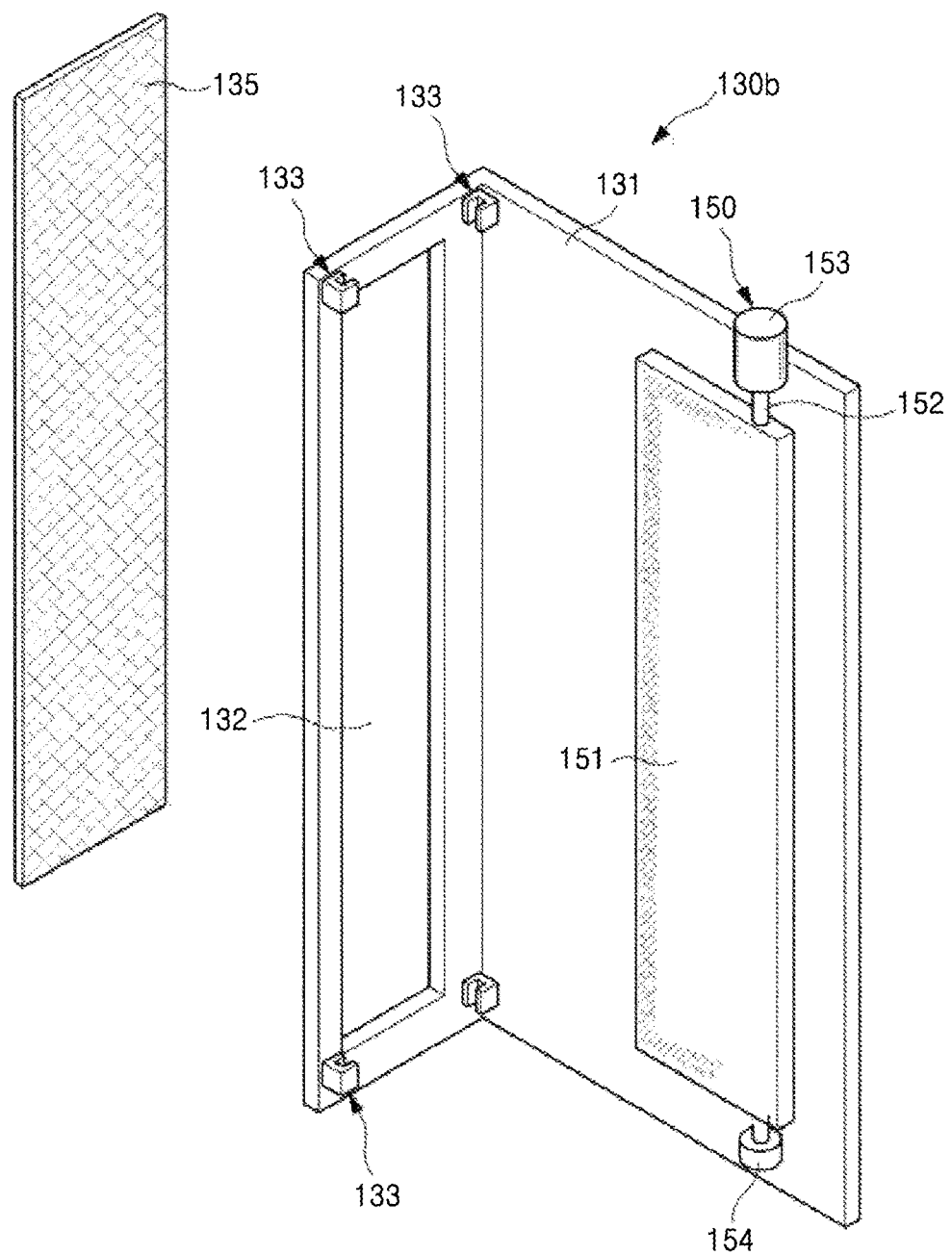
FIGS. 7 and 8 are views illustrating an operation of a right variable air volume control device.
Figure 8:
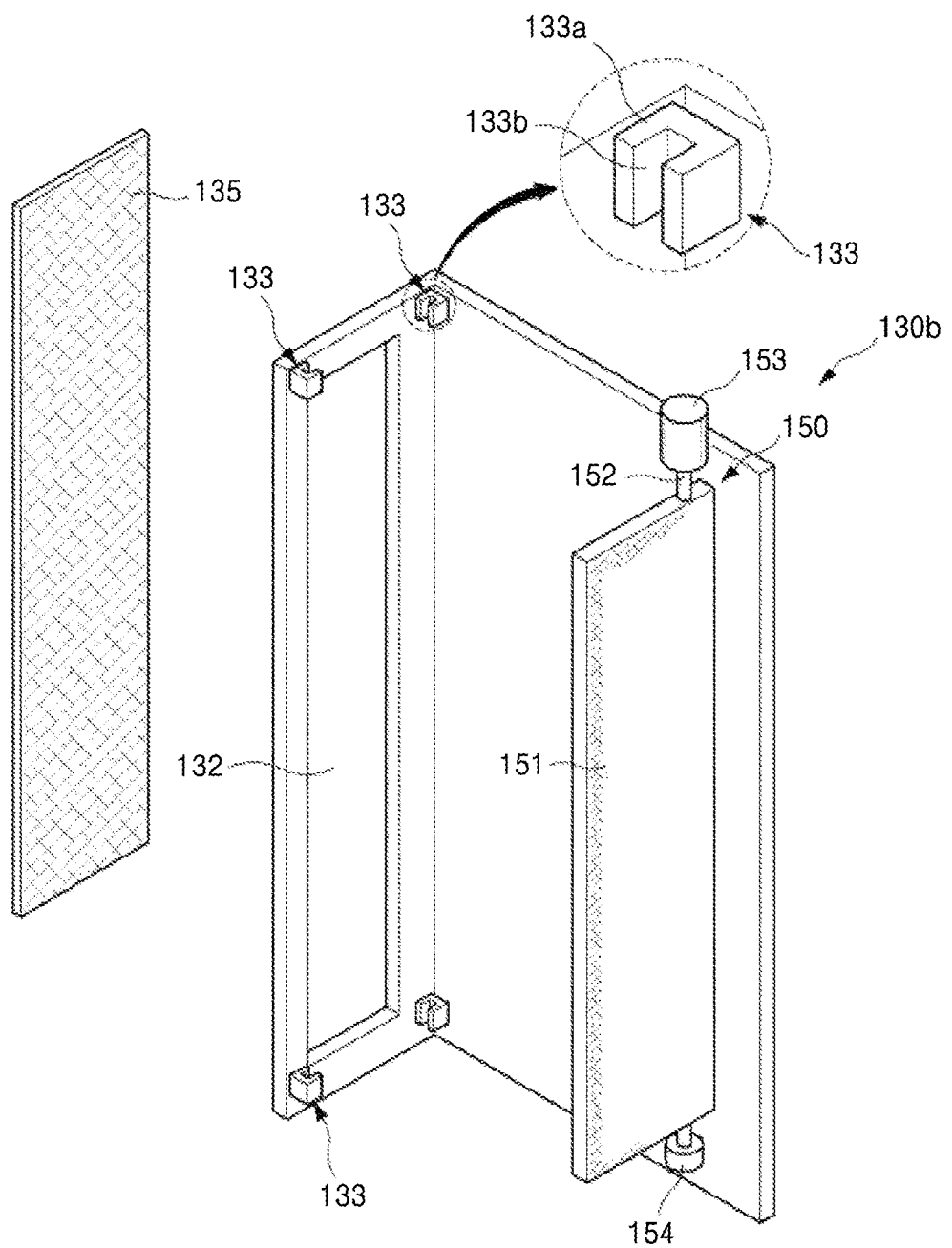
Figure 9:
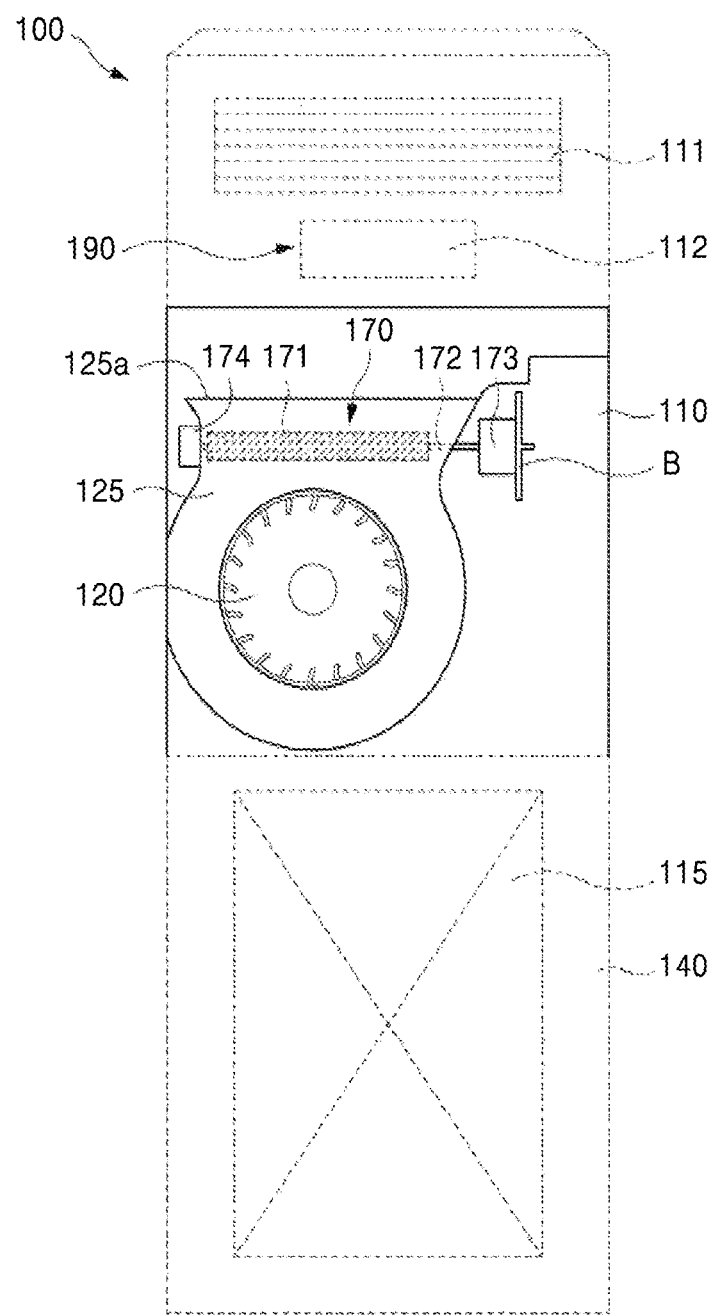
FIG. 9 is a view illustrating variable air volume control devices arranged in and adjacent to a blower.
Figure 10:
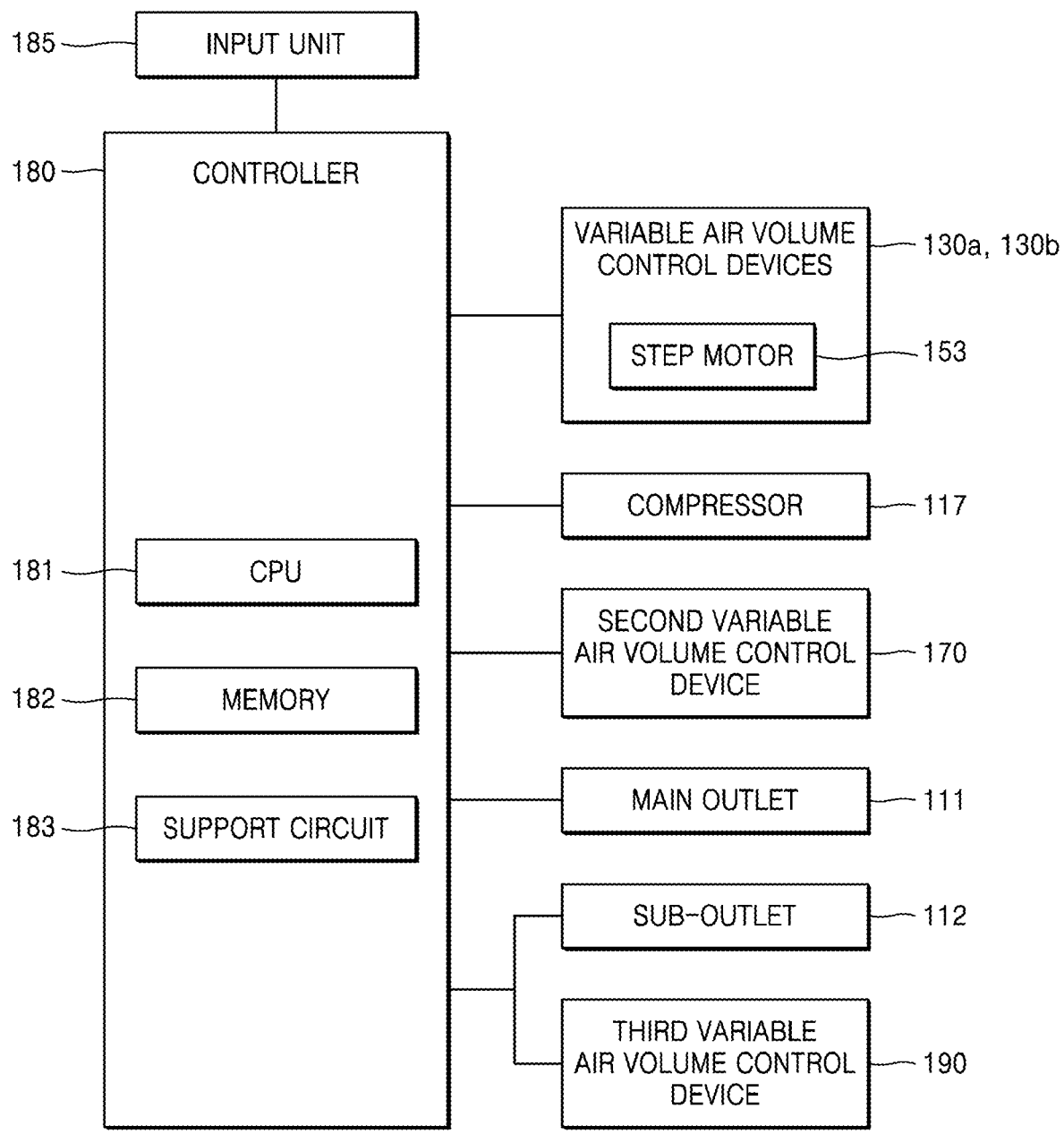
FIG. 10 is a view illustrating a structure of the air conditioner according to an embodiment of the present invention.

FIG. 2 is a schematic front perspective view illustrating an air conditioner according to a first embodiment of the present invention; FIG. 3 is a perspective view illustrating a front inlet panel; FIG. 4 is a perspective view illustrating a blade unit; FIGS. 5 and 6 are views illustrating an operation of a first left variable air volume control device; FIGS. 7 and 8 are views illustrating an operation of a first right variable air volume control device; FIG. 9 is a view illustrating variable air volume control devices arranged in a blower region; and FIG. 10 is a view illustrating a structure of the air conditioner according to an embodiment of the present invention.

Referring to FIGS. 2 to 10, when the air conditioner 100 of the embodiment is operated in an air cleaning mode, the discharge rate of air may be varied independently of the discharge rate of air in a heating or cooling mode. In other words, a user may adjust the range of a first discharge rate of air in the heating or cooling mode to be different from the range of a second discharge rate of air in the air cleaning mode.

The air conditioner 100 may include a variable air volume control device in at least one air passage, or a blower motor control line for each mode, so as to independently adjust the first discharge rate of air in the heating or cooling mode and the second discharge rate of air in the air cleaning mode. For example, a control method using a variable air volume control device and a control method using blower motor control lines may be used in combination so as to adjust the second discharge rate of air in the air cleaning mode. The control method using a variable air volume control device will be first described with reference to FIGS. 2 to 10, and the control method using blower motor control lines will be described later with reference to FIG. 13.

The variable air volume control devices illustrated in FIGS. 2 to 10 are non-limiting examples provided to help understand the present invention. For example, such a variable air volume control device may be provided in at least one air passage of the air conditioner 100 (such as an air intake passage or an air discharge passage). In the following description, however, only the case in which variable air volume control devices are provided in a front inlet panel 140, a blower outlet 125a, and a sub-outlet 112 will be described for conciseness of description.

The air conditioner 100 includes first variable air volume control devices 130a and 130b, a second variable air volume control device 170, and a third variable air volume control device 190 that are provided at different positions, and thus the discharge rate of air in the air cleaning mode may be varied independently of the discharge rate of air in the heating or cooling mode.

In the embodiment, the first variable air volume control devices 130a and 130b, the second variable air volume control device 170, and the third variable air volume control device 190 are provided in three positions. However, the number and positions of variable air volume control devices may vary according to embodiments. For example, the air conditioner 100 may include at least one among the first variable air volume control devices 130a and 130b, the second variable air volume control device 170, and the third variable air volume control device 190.

In the embodiment, the air conditioner 100 may include an indoor unit main body 110, a blower 120, a front inlet panel 140, the first variable air volume control devices 130a and 130b, the second variable air volume control device 170, and the third variable air volume control device 190.

As described above, the air conditioner 100 may include an indoor unit and an outdoor unit. The outdoor unit may include a compressor 117 and a heat exchanger (not shown). The indoor unit may include a heat exchanger 115, the blower 120, and an air filter (not shown).

The structure of the air conditioner 100 illustrated in the drawings may be the structure of the indoor unit of the air conditioner 100, and so, the indoor unit may be a stand-type indoor unit.

However, the scope of the present invention is not limited thereto. The air conditioner 100 of the embodiment is not limited to including a stand-type indoor unit. For example, the air conditioner 100 may be an integrated air conditioner in which indoor and outdoor units are combined, a wall-mount type air conditioner, or a ceiling-mount type air conditioner.

The indoor unit main body 110 forms the exterior of the air conditioner 100 of the embodiment. The indoor unit main body 110 may be coupled to an exterior cabinet 113 in which many components are arranged.

The indoor unit main body 110 includes a main outlet 111 to discharge air (cool, hot, or purified air). A louver may be provided on the main outlet 111 so as to close or open the main outlet 111.

The sub-outlet 112 is adjacent to the main outlet 111, and the blower 120 is provided inside the main outlet 111. The front inlet panel 140 is provided below the main outlet 111 to introduce ambient air into the indoor unit main body 110.

For example, variable air volume control devices may be arranged at three positions so as to independently vary the discharge rate of air. That is, the first variable air volume control devices 130a and 130b may be provided in a region of the front inlet panel 140, the second variable air volume control device 170 may be provided in a region of the blower 120, and the third variable air volume control device 190 may be provided in a region of the sub-outlet 112. The first to third variable air volume control devices 130a, 130b, 170, and 190 may have substantially identical structures.

The first variable air volume control devices 130a and 130b, the second variable air volume control device 170, and the third variable air volume control device 190 are independently operated at their positions, and thus the discharge rate of air may be adjusted independently of a cooling or heating operation unlike the case of related art in which the discharge rate of air is dependent on a cooling or heating operation.

First, the first variable air volume control devices 130a and 130b provided in the region of the front inlet panel 140 will be described.

Inlets 141a and 141b are formed in both lateral sides of the front inlet panel 140. The inlets 141a and 141b have a hole shape and may be referred to as a left inlet 141a and a right inlet 141b according to their positions.

The first (left) variable air volume control device 130a (refer to FIGS. 5 and 6) may be provided at the left inlet 141a, and the first (right) variable air volume control device 130b (refer to FIGS. 7 and 8) may be provided at the right inlet 141b. The first left and right variable air volume control devices 130a and 130b have identical structures and functions except that the first left and right variable air volume control devices 130a and 130b are arranged at different angles.

The first left variable air volume control device 130a (refers to FIGS. 5 and 6) is coupled to the front inlet panel 140 in a region of the left inlet 141a, so as to open or close the left inlet 141a according to rotation of a blade 151.

Similarly, the first right variable air volume control device 130b (refers to FIGS. 7 and 8) is coupled to the front inlet panel 140 in a region of the right inlet 141b, so as to open or close the right inlet 141b according to rotation of a blade 151.

Each of the first left and right variable air volume control devices 130a and 130b includes a device frame 131 coupled to the front inlet panel 140, filter supports 133 coupled to a region around an opening 132 formed in a side of the device frame 131, and a blade unit 150 coupled to the device frame 131 to close or open the inlet 141a or 141b.

A pre-filter 135 is coupled to the filter supports 133 so as to remove contaminants from air drawn into the indoor unit main body 110. The filter supports 133 are examples and may not be used. That is, the pre-filter 135 may be kept in position by any other method.

In the embodiment, the filter supports 133 may be rail-type supports. That is, the filter supports 133 may include support bodies 133a in which rail insertion portions 133b are formed, and the pre-filter 135 may be inserted into the rail insertion portions 133b.

The blade unit 150 may be coupled to a side of the device frame 131, and if the air cleaning mode is selected through an input unit 185, the blade unit 150 may open or close the left or right inlet 141a or 141b so as to vary the discharge rate of air.

In the embodiment, the blade unit 150 includes: the blade 151 having a size equal to or greater than the size of the inlet 141a or 141b and oriented perpendicular or parallel to the inlet 141a or 141b; a step motor 153 coupled to an end portion of a rotation shaft 152 forming the axis of rotation of the blade 151 so as to rotate the blade 151; and a bearing 154 coupled to the other end portion of the rotation shaft 152 such that the blade 151 may be rotatably supported.

In this case, the blade 151 may be rotated 90 degrees by the step motor 153 under the control of a controller 180 as shown in FIGS. 5 to 8. That is, the step motor 153 may rotate the blade 151 under the control of the controller 180 so as to orient the blade 151 in a direction perpendicular or parallel to the inlet 141a or 141b.

In this case, the rotation shaft 152 may be located in the blade 151 at a lateral position separate from the center of a cross-section of the blade 151.

Next, the second variable air volume control device 170 provided in the region of the blower 120 will be described.

Unlike the first variable air volume control devices 130a and 130b, the second variable air volume control device 170 is provided in the region of the blower 120 and is operated independently of the first variable air volume control devices 130a and 130b so as to adjust the discharge rate of air blown by the blower 120.

As shown in FIG. 9, the second variable air volume control device 170 includes a blower outlet blade 171 placed in a blower housing 125 forming the exterior of the blower 120, and the blower outlet blade 171 is rotated within a preset angle range so as to adjust the discharge rate of air blown by the blower 120 toward the blower outlet 125a of the blower housing 125.

In the embodiment, the second variable air volume control device 170 is substantially the same as the blade unit 150. That is, the second variable air volume control device 170 includes: a blower outlet blade 171 placed at a position adjacent to the blower outlet 125a within the blower housing 125 forming the exterior of the blower 120; a step motor 173 coupled to a rotation shaft 172 of the blower outlet blade 171 to apply rotation force to the rotation shaft 172 of the blower outlet blade 171; and a blower outlet bearing 174 supporting an opposite end of the rotation shaft 172 while allowing the rotation shaft 172 to rotate. The step motor 173 may be supported on a bracket B placed inside the exterior cabinet 113.

The controller 180 may control the step motor 173 according to a signal input to the input unit 185 so as to rotate the blower outlet blade 171 within a preset angle range and thus to close or open the blower outlet 125a.

In the embodiment, the blower 120 is located above the heat exchanger 115. However, the blower 120 may be located below the heat exchanger 115. Such modifications of the arrangement of the blower 120 and the heat exchanger 115 are within the scope of the present invention.

Finally, the third variable air volume control device 190 provided on the sub-outlet 112 will now be described.

Although not illustrated in detail, unlike the first variable air volume control devices 130a and 130b and the second variable air volume control device 170, the third variable air volume control device 190 is provided in the region of the sub-outlet 112 and is operated independently of the first variable air volume control devices 130a and 130b and the second variable air volume control device 170 so as to vary the discharge rate of air flowing through the sub-outlet 112.

Owing to the third variable air volume control device 190, clean air may be discharged through the sub-outlet 112 independently of air flowing through the main outlet 111.

That is, in the air cleaning mode, only when the discharge rate of clean air is adjusted, the sub-outlet 112 is opened, and clean air is discharged through the sub-outlet 112. At this time, the controller 180 may determine whether to open or close the main outlet 111 according to preset conditions, and the compressor 117 of the outdoor unit may be stopped. For example, in the air cleaning mode, when the discharge rate of air is adjusted in five steps, as shown in Table 1, the controller 180 may close the main outlet 111 so as to adjust the discharge rate of air to be lower than the discharge rate of air in the heating or cooling mode and may open the main outlet 111 so as to adjust the discharge rate of air to be equal to or higher than the discharge rate of air in the heating or cooling mode.

Alternatively, the third variable air volume control device 190 may be positioned in a region of the main outlet 111. The third variable air volume control device 190 has identical structures as the second variable air volume control device 170, and thus a description thereof will not be presented here for conciseness.

The controller 180 individually controls operations of the first variable air volume control devices 130a and 130b, the second variable air volume control device 170, and the third variable air volume control device 190 according to signals input to the input unit 185 such as a remote control.

The controller 180 may control at least one of the first to third variable air volume control devices 130a, 130b, 170, and 190 so as to adjust the discharge rate of air in the air cleaning mode independently of the discharge rate of air in the heating or cooling mode. Table 1 below shows examples of control values that may be set for the first to third variable air volume control devices 130a, 130b, 170, and 190 so as to adjust the discharge rate of air to be within the range of 0 to 15 m3/min (CMM) in the air cleaning mode. Table 1 is an example to help understand the present invention. That is, control values such as angles of the first to third variable air volume control devices 130a, 130b, 170, and 190 may be varied according to embodiments.

TABLE 1

| | | Variable air volume control device states | | | |
|---|---|---|---|---|---|
| Devices | Discharge rate of air (CMM) | First variable air volume control devices | Second variable air volume control device | Third variable air volume control device | Main outlet |
| Ranges | 10 to 15 | 0° | 0° | open or closed | open |
| | 7 to 9.9 | 20° | 30° | open | closed |
| | 4 to 6.9 | 30° | 40° | open | closed |
| | to 3.9 | 45° | 60° | open | closed |
| | 0 | 90° | 0° | closed | closed |

For example, if the mode selected using the controller 180 is the air cleaning mode, particularly a silent air cleaning mode in which the discharge rate of air is decreased, the controller 180 may stop the compressor 117, close the main outlet 111, and open only the sub-outlet 112 so as to discharge clean air through the sub-outlet 112.

In another example, if the discharge rate of air in the heating or cooling mode is adjusted in three steps, the discharge rate of air in the air cleaning mode may be adjusted in more steps than in the heating or cooling mode. That is, if the discharge rate of air is adjusted in three steps in the heating or cooling mode by controlling the rotation speed of a motor, the rotation speed of the motor may be controlled in three steps in the air cleaning mode as in the heating or cooling mode. In this case, owing to the variable air volume control devices 130a, 130b, 170, and 190 of the embodiment, the discharge rate of air in the air cleaning mode may be controlled in five steps as shown in Table 1 instead of three steps.

In another example, if the discharge rate of air in the air cleaning mode is set to be equal to the discharge rate of air in the heating or cooling mode, the first to third variable air volume control devices 130a, 130b, 170, and 190 may not be operated, and the main outlet 111 may be opened. However, if the discharge rate of air in the air cleaning mode is set to be different from the discharge rate of air in the heating or cooling mode, the sub-outlet 112 (that is, the third variable air volume control device 190) is opened.

That is, although the speed of a blower motor is constant in the heating or cooling mode and the air cleaning mode, the controller 180 may control at least one of the first to third variable air volume control devices 130a, 130b, 170, and 190 so as to obtain a first discharge rate of air in the heating or cooling mode and a second discharge rate of air in the air cleaning mode, wherein the second discharge rate of air may be different from the first discharge rate of air.

The controller 180 may include a central processing unit (CPU) 181, a memory 182, and a support circuit 183.

The CPU 181 may be one of various industrial computer processors capable of individually controlling operations of the first variable air volume control devices 130a and 130b, the second variable air volume control device 170, and the third variable air volume control device 190.

The memory 182 is connected to the CPU 181. The memory 182 is a computer-readable recording medium which is locally or remotely installed. For example, the memory 182 may include at least one commonly available memory such as a random access memory (RAM), a read only memory (ROM), a floppy disk, a hard disk, and a digital recording medium.

The support circuit 183 is coupled to the CPU 181 to support operations of the CPU 181. The support circuit 183 may include a cache, a power supply, a clock circuit, an input/output circuit, a sub-system, or the like.

In the embodiment, the controller 180 individually controls operations of the first variable air volume control devices 130a and 130b, the second variable air volume control device 170, and the third variable air volume control device 190 according to signals input to the input unit 185. In the embodiment, the memory 182 may store processes of the controller 180 for individually controlling operations of the first variable air volume control devices 130a and 130b, the second variable air volume control device 170, and the third variable air volume control device 190 according to signals input to the input unit 185. Typically, software routines may be stored in the memory 182. Alternatively, the software routines may be stored or executed by another CPU (not shown).

In the embodiment, the processes are performed using the software routines. However, at least some of the processes may be performed using hardware. That is, the processes of the embodiment may be embodied as software executable in a computer system, hardware such as an integrated circuit, or a combination of software and hardware.

According to the structures and functions of the embodiment, unlike in the related art, the discharge rate of air may be adjusted in the air cleaning mode independently of the discharge rate of air in the heating or cooling mode. That is, the discharge rate of air may be independently adjusted in the air cleaning mode according to a user's instruction.

In the embodiment, particularly, since the discharge rate of air is independently adjustable without a significant structural change, the air conditioner 100 may be very conveniently used and losses that may be caused by the purchase of an additional air cleaner may be prevented.

Figure 11:
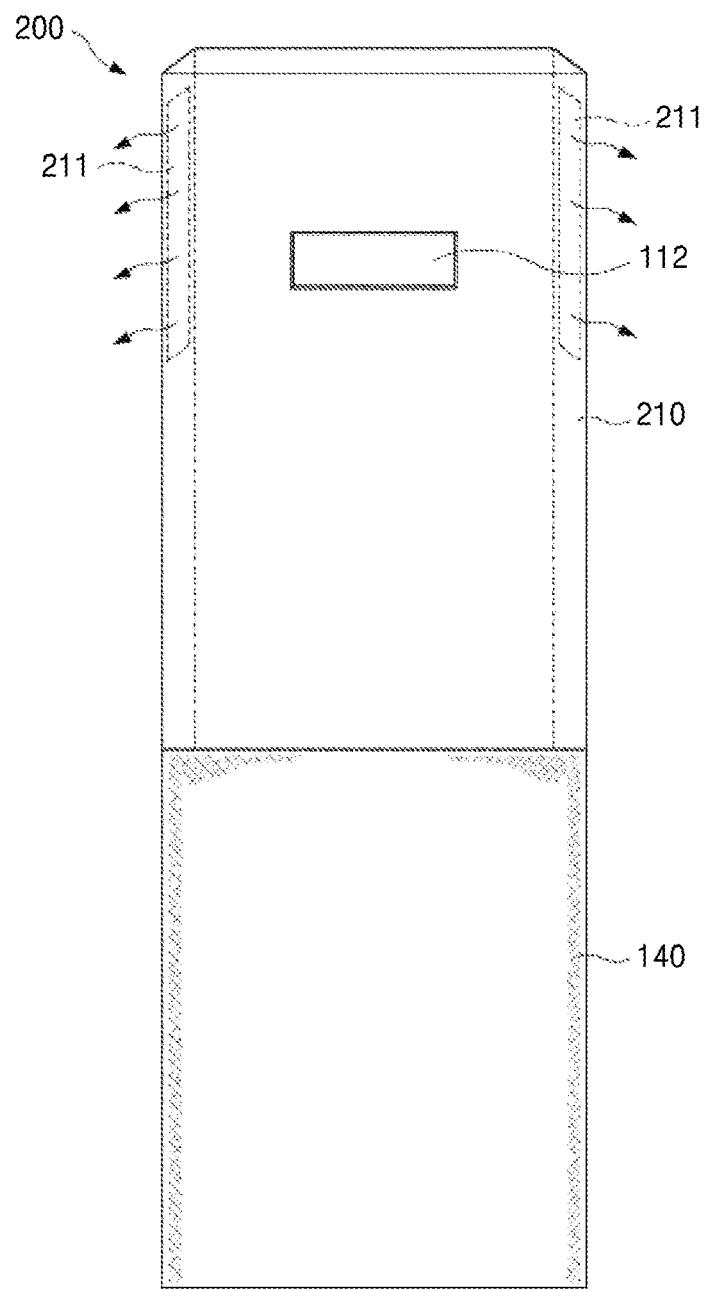
FIG. 11 is a schematic front perspective view illustrating an air conditioner according to a second embodiment of the present invention.

FIG. 11 is a schematic front perspective view illustrating an air conditioner 200 according to a second embodiment of the present invention.

The air conditioner 200 of the current embodiment has the same structure as the air conditioner 100 of the previous embodiment.

In the current embodiment, however, main outlets 211 are provided on both sides of an indoor unit main body 210. That is, the air conditioner 200 has the same structure and functions as the air conditioner 100 of the previous embodiment except for the main outlets 211.

In the current embodiment, unlike in the related art, the discharge rate of air may be adjusted in the air cleaning mode independently of the discharge rate of air in the heating or cooling mode. That is, the discharge rate of air may be independently adjusted in the air cleaning mode according to a user's instruction.

Figure 12:
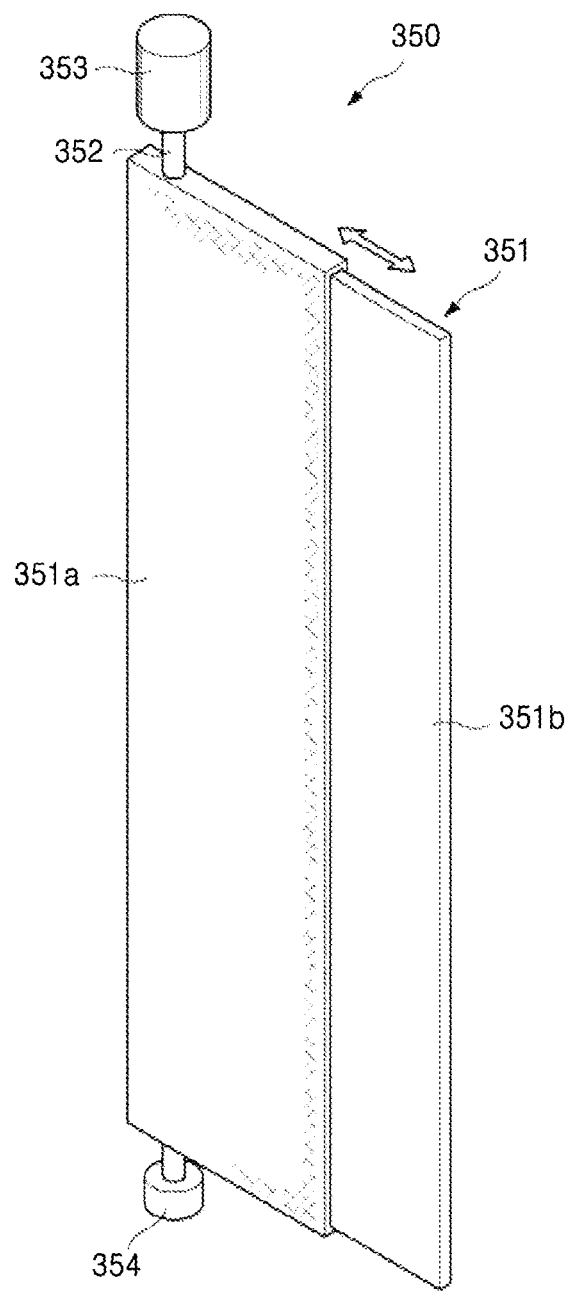
FIG. 12 is a view illustrating a modified variable air volume control device according to the present invention.

FIG. 12 illustrates a modified variable air volume control device.

Referring to FIG. 12, a blade unit 350 includes: a blade 351 oriented perpendicular or parallel to the inlet 141a or 141b (refer to FIG. 3); a step motor 353 coupled to an end portion of a rotation shaft 352 forming the axis of rotation of the blade 351 to rotate the blade 351; and a bearing 354 coupled to the other end portion of the rotation shaft 352 such that the blade 351 may be rotatably supported.

The blade 351 includes a plurality of slidable plates 351a and 351b such that the area of the blade 351 may be automatically adjusted.

According to the current embodiment in which the blade 351 includes the plurality of slidable plates 351a and 351b, many advantages such as flexibility in handling the size of the inlet 141a or 141b and precision in adjusting the open area of the inlet 141a or 141b may be obtained.

If the variable air volume control device 350 is used, unlike in the related art, the discharge rate of air may be adjusted in the air cleaning mode independently of the discharge rate of air in the heating or cooling mode. That is, the discharge rate of air may be independently adjusted in the air cleaning mode according to a user's instruction.

Figure 13:
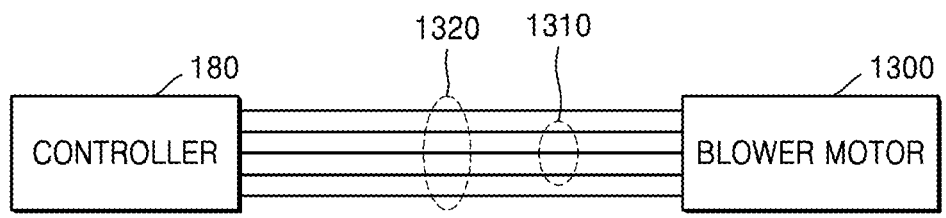
FIG. 13 is a view illustrating a method of adjusting the discharge rate of air in an air cleaning mode according to another embodiment of the present invention.

FIG. 13 is a view illustrating a method of adjusting the discharge rate of air in an air cleaning mode according to another embodiment of the present invention.

Referring to FIG. 13, a blower motor 1300 of a blower 120 receives control signals from a controller 180 through a plurality of control lines. The controller 180 uses first group control lines 1310 of the plurality of control lines so as to control a first discharge rate of air in a heating or cooling mode, and second group control lines 1320 of the plurality of control lines so as to control a second discharge rate of air in an air cleaning mode. The first group control lines 1310 and the second group control lines 1320 may share some control lines. In the current embodiment, the controller 180 uses the second group control lines 1320 that include the first group control lines 1310 and additional two control lines, so as to control the second discharge rate of air in the air cleaning mode.

The speed of the blower motor 1300 may be increased or decreased according to control signals received through the control lines so as to vary the discharge rate of air of the blower 120. For example, the speed of the blower motor 1300 is controlled as shown in Table 2.

TABLE 2

| | Motor speed control | | |
|---|---|---|---|
| Modes | Heating or cooling mode | Air cleaning mode | Overall control steps of motor |
| Motor speed steps | A<br>B<br>C | S<br>A<br>B<br>C<br>L | S<br>A<br>B<br>C<br>L |
| | =>3 steps | =>5 steps | =>5 steps |

For example, the controller 180 may control the blower motor 1300 so as to adjust the first discharge rate of air in three steps A, B, and C within the range of 5 to 10 m3/min (CMM) in the heating or cooling mode, and the second discharge rate of air in five steps S, A, B, C, and L within the range of 3 to 15 m3/mm (CMM). In other words, the maximum of the second discharge rate of air in the air cleaning mode may be adjusted to be higher than the maximum of the first discharge rate of air in the heating or cooling mode, and the minimum of the second discharge rate of air in the air cleaning mode may be adjusted to be lower than the minimum of the first discharge rate of air in the heating/cooling mode.

In the case of only using the variable air volume control devices 130a, 130b, 170, and 190 illustrated with reference to FIGS. 2 to 10, since the speed of the blower motor 1300 is constant in the cooling/heating mode and the air cleaning mode, the discharge rate of air in the air cleaning mode is not increased higher than the maximum of the discharge rate of air in the cooling/heating mode. According to the current embodiment, however, the speed of the blower motor 1300 may be adjusted according to modes, and thus the discharge rate of air may be adjusted within different ranges in different modes.

In another embodiment, the variable air volume control devices 130a, 130b, 170, and 190 described with reference to FIGS. 2 to 10 may be used together with the motor control method described with reference to FIG. 13 so as to adjust the discharge rate of air within more various ranges in more steps in the air cleaning mode. For example, in the air cleaning mode, when the motor speed is in the step S shown in Table 2, the variable air volume control devices 130a, 130b, 170, and 190 described with reference to FIGS. 2 to 10 may be controlled so as to adjust the discharge rate of air within a range obtainable between the motor speed steps S and A. Furthermore, in the air cleaning mode, the variable air volume control devices 130a, 130b, 170, and 190 may be adjusted so as to adjust the discharge rate of air to be lower than the discharge rate of air obtainable by the motor speed step L.

While embodiments of the present invention have been described, it will be understood by those of ordinary sill in the art that various changes and modifications may be made therein without departing from the spirit and scope of the present invention. That is, such changes and modifications are included in the scope of the present invention defined by the following claims.

The invention claimed is:

1. An air conditioner comprising:
   an inlet configured to receive air into the air conditioner;
   a main outlet configured to discharge the air from the air conditioner,
   a sub-outlet configured to discharge the air from the air conditioner, the sub-outlet having a size smaller than the main outlet;
   a blower configured to blow the air toward the main outlet and the sub-outlet in an air cleaning mode and in a heating or cooling mode;
   a blade unit configured to vary an air volume flowing in an air flow path from the inlet and to the main outlet or the sub-outlet; and
   a controller configured to, in the air cleaning mode, close the main outlet so as to discharge the air through the sub-outlet,
   wherein the controller controls the blade unit so as to adjust a second discharge rate of the air in the air cleaning mode independently of a first discharge rate of the air in the heating or cooling mode.

2. The air conditioner of claim 1, further comprising:
   a remote control configured to generate an input signal to select the air cleaning mode.

\* \* \* \* \*